RECORDING AND PLAYING BACK PLURAL IMAGES OF RELATED SEQUENCES OF OBJECTS BY WIDE-BAND, CROSS-SCAN RECORDING OPERATIONS
Original Filed May 4, 1954
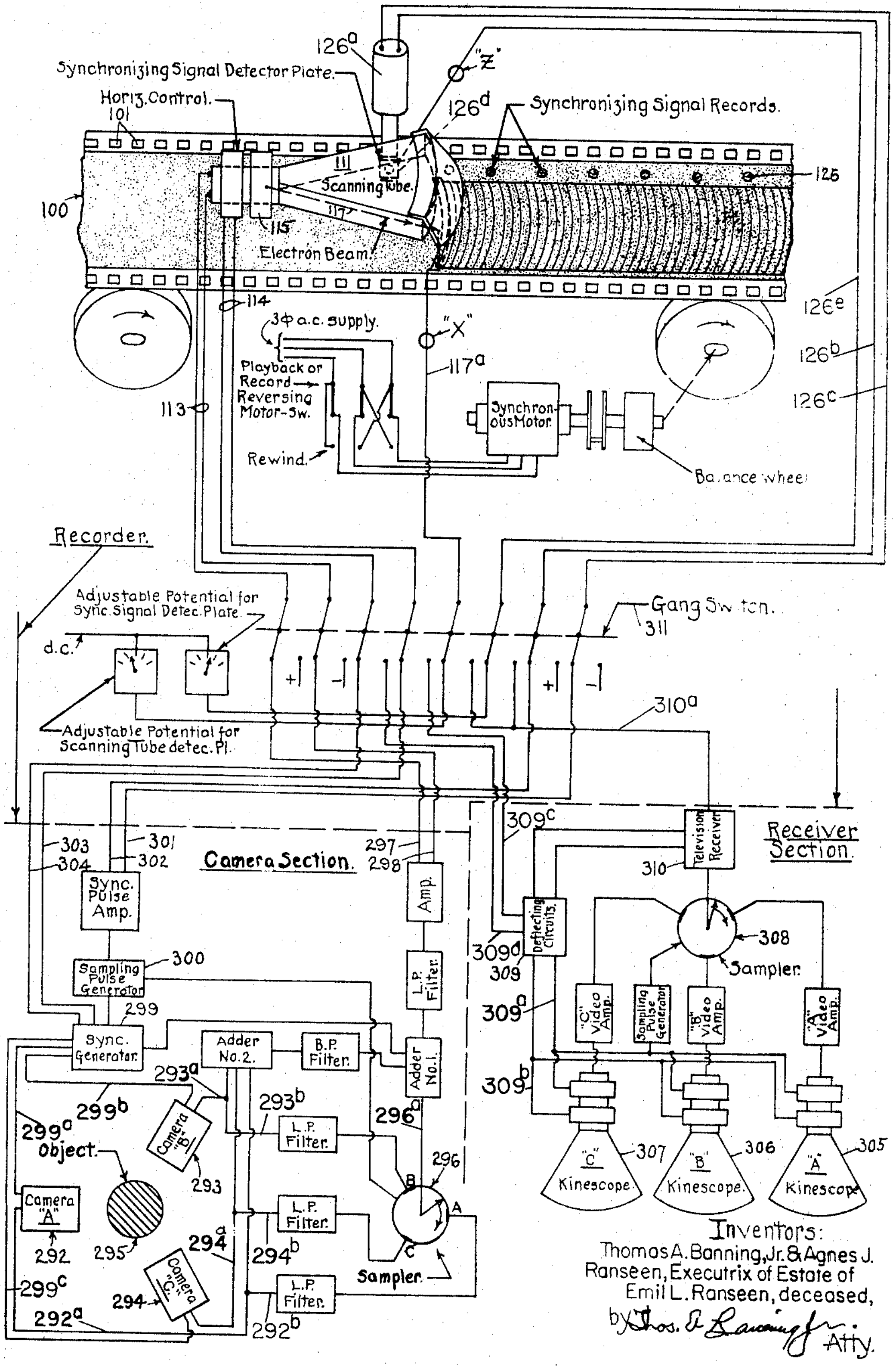
Inventors:
Thomas A. Banning, Jr. & Agnes J. Ranseen, Executrix of Estate of Emil L. Ranseen, deceased,
by Thos. A. Banning Jr. Atty.

United States Patent Office 3,472,949
Patented Oct. 14, 1969

3,472,949

RECORDING AND PLAYING BACK PLURAL IMAGES OF RELATED SEQUENCES OF OBJECTS BY WIDE-BAND, CROSS-SCAN RECORDING OPERATIONS

Thomas A. Banning, Jr., 5500–5520 S. Shore Drive, Apt. 1408, Chicago, Ill. 60637, and Emil L. Ranseen, deceased, late of Chicago, Ill., by Agnes J. Ranseen, executrix, 933 Hinman Ave., Evanston, Ill. 60202

Original application May 4, 1954, Ser. No. 427,428, now Patent No. 2,976,354, dated Mar. 21, 1961. Divided and this application Apr. 22, 1966, Ser. No. 544,626
Int. Cl. H04n 5/76, 3/00
U.S. Cl. 178—6.6 12 Claims

ABSTRACT OF THE DISCLOSURE

This case discloses arrangements whereby the video signals from a plurality of video cameras (e.g., three) may emit in regular successive order, video signals, which are recorded in the same orderly progress on the tape; together with a plurality of TV receivers corresponding to the camera; together with switching facilities for producing the successive recordings of the video signals from the cameras, on the tape, and for afterwards playing-back such recorded signals to the corresponding receives, in the order of receiver translation, the same as the order of tape recording.

This invention relates to improvements in recording and playing back plural images of related sequences of objects by wide-band, cross-scan recording operations. This application is a division of our co-pending application, Ser. No. 419,612, filed Dec. 18, 1964, and still pending; which application, Ser. No. 419,612, was a division of our application, Ser. No. 94,651, filed Mar. 9, 1961, issued as Letters Patent, No. 3,164,685, Jan. 5, 1965; and which application, Ser. No. 94,651 was a division of application, Ser. No. 427,428, filed May 4, 1954 by Emil L. Ranseen and myself, and issued as Letter Patent, No. 2,976,354, Mar. 21, 1961.

By the term "plural images of related sequences of objects," we refer to the production of recordings of images of related operations, usually but not necessarily, images of a single object, viewed from several vantage points to reveal the coordinated operations of each object, occurring at the same or substantially the same, time, so that the related operations may be played-back and viewed on a plurality of viewing screens (e.g., of several TV receivers, located at convenient points for simultaneous viewing by interested parties, to enable such parties to observe related operations occurring at substantially the same time). An illustration of such a sequence of events as just referred to, and which events may be recorded and afterwards played back according to the structures and operations hereinafter to be disclosed, might be the operations occurring at the tuyeres of a blast furnace, when such tuyeres are viewed, simultaneously from three or four vantage points located around the tuyeres. Another illustration might be the viewing of the last fifty or one hundred feet of a race-track, to gain correct recording and playing back of the relations of the several contesting horses as they came successively to the finish line. In this case three or four cameras would be mounted and focused onto successive positions along the track at such finish position. In either or both of the above suggested operations and uses of the features of the present invention, it is important to be able to record the related operations simultaneously, and to play back the recordings thus produced, almost immediately after such recordings, in order to comply with desired subsequent operations, or to make necessary decisions promptly and with dependable information available without delay after the events have occurred.

The present application concerns itself with the provision of tape recording equipment, whereby signals received from a plurality of television cameras focused at the several vantage points towards the related operations, may be recorded on a common wide-band tape by cross-scanning operations, with the signals from the several cameras interwoven during the cross-scan recordings, according to a regular recurrence of the cross-scans of each camera, according to a regular succession of the cross-scan recordings of the several cameras. By such operation video signals from the several cameras are fed to the cross-scan recording unit in a regular succession of progress, constantly repeated, so that the cross-scan recordings for all of the viewing cameras are recorded as cross-scan recordings in such regular succession or spatial progress. The arrangement may be one in which signals from each camera to produce only a single cross-scan at a time, followed by single cross-scan recordings of all of the other cameras, are produced, so that recordings for each camera occupy a proportion of the length of the tape, depending on the number of cameras whose signals are being recorded. Or, if desired, each camera may produce two or three or more cross-scans in succession, followed by a like number of cross-scans of each of the other cameras, through the cycle, repeating such spatial cycle regularly during the interval of the operation. When operating at the present conventional lateral deflection rate of 15,750 scans/sec., it is apparent that a number of such cross-scans may be produced as each group for the corresponding camera, with switching to the next camera for production of a like number of cross-scans in succession, proceeding thus through the cycle, and repeating the succession for each cycle. In such case the persistence of vision will enable production of a visibly continuous picture of the occurrences signalled by each camera, so that even when a substantial group of cross-scans are signalled in succession for each camera before switching to the next camera, a satisfactory operation may be produced when back playing the recorded signals.

In conformity with the foregoing stated operations, we have made provision for producing a cross-scan recording corresponding to each lateral deflection of the kinescope beam of a conventional TV receiver, thus producing 15,750 cross-scans recordings/sec. In an embodiment of our present improvements, which embodiment includes three cameras viewing the object or the area from different vantage points, each such camera may deliver 15,750/3 scans per second, being 5,250 scans/sec. Thus each of the viewings will be produced by translation of 5,250 scans/sec. In an embodiment wherein each camera delivered 125 scans as each of its groups of scans with the groups of scans delivered by the three cameras interwoven in a regular spatial succession along the tape, there would afterwards be sensed during the play-back operation, 125 scans from camera A, followed by 125 scans from camera B, followed by 125 scans from camera C, followed by 125 scans from camera A, etc., repetitiously; and there would be delivered to each of three kinescopes the signals of the groups from the corresponding camera. Thus, each kinescope would receive 42 groups of scan signals/sec., during an interval of $\frac{1}{126}$ sec., or at the rate of 126 such groups/sec. Such a rate is far beyond the requirements of good viewing, since the persistence of vision would merge the successive groups delivered to each kinescope in manner to produce the desired continuity of vision for good picture translation.

We have provided means to deliver to the cross-scan recording unit of the recorder, scan signals produced by one (or more cross scans) of the corresponding camera, followed by scan signals produced by the succeeding camera, followed by scan signals prodced by the succeeding camera, back to the first defined camera; so that the signals (either individually or as groups) delivered by the several cameras, are recorded on the tape in the same order of sequence as the order of their production and delivery by the several cameras. Such operations require the provision of means to successively cause delivery of the successive signals or groups of signals, to the recording head of the recorder; and for this purpose we have provided sampler means to direct the scan signals from the several cameras, successively to the recording head of the recorder. Such sampler means is under control of a deflection producing unit, such as a saw-tooth generator, so that the lateral scans of the cameras and the operations of the sampler means, are properly coordinated. Such deflection producing unit also delivers to the recording head of the recorder (when such recording head comprises a deflectable beam unit, or other recording unit constituted to produce the cross-scan recordings on the tape), signals to control the production of the cross-scan recordings. Thereby the sacn signals from the several cameras are delivered to the recording head of the recorder, either singly or in groups, in the spatial sequence along the tape corresponding to the order of emission of the scan signals by the several cameras. It is thus evident that the scanning operations of the several cameras, the controlling operations of the sampler, and the scanning operations of the recording head of the recorder, are all under control of a single deflection producing unit, and thus all such operations are properly coordinated.

There are provided kinescopes corresponding in number to the signal producing cameras, with provision for delivering to such several kinescopes, sensed cross-scan recordings which correspond to the several cameras, and thus also, to the several kinescopes. Since the cross-scan recordings from the several cameras have been successively spatially produced on the tape, according to the sequence hereinbefore referred to, and since the several kinescopes correspond to the several cameras which produced the several recorded cross-scan signals or groups of such signals, it is also necessary to provide sampling means between the sensing unit of the recorder, and the several kinescopes, to cause delivery to each kinescope, only recorded signals which correspond to such kinescope. We have provided such play-back sampling means. We have also provided suitable controls between the lateral deflection producing means already referred to, and the kinescope sampler, constituted to cause such kinescope sampler to deliver to each kinescope, only the sensed scan record signals which correspond to such kinescope. Thus, all of the coordinations needed between the several cameras, the recordings produced on the tape, and the playing-back of the scanned recordings, are produced by a single control unit, being (in the illustrated embodiment), the single lateral deflection generator, such as a saw-tooth generator.

The cross-scan recording unit, and the cross-scan sensing unit herein disclosed and included in the illustrated embodiment, include a deflectable beam unit, wherein the beam deflections are produced by lateral deflection signals. Such structures are fully disclosed in Letters Patent of the United States, No. 2,976,354, issued to the undersigned Thomas A. Banning, Jr., on the joint application of Emil L. Ranseen and said Banning, and such deflectable beam units are also fully disclosed in other applications issued to the said Banning. Such form of unit for producing the recordings, and for afterwards sensing and producing signals corresponding to the sensed scans, is well adapted to use a portion of the structures needed to produce the functions and operations already referred to. However, we do not intend to limit our presently disclosed improvements to such form of recording and/or sensing unit, except as we may do so in the claims to follow.

Under Rules of the Federal Communications Commission the video signals are emitted by the TV camera as two fields of scans, for each picture frame. The main field and the interlace field each comprise 262½ scans (possibly 263 and 262, respectively), and there are produced sixty fields/sec. A convenient embodiment of our present invention (and which is shown in the drawings, and referred to elsewhere in this specification), wherein there are provided three cameras viewing the object from three vantage points, is one under which the following sequence of viewing and signallings, is produced:

Assuming the cameras to be identified as A, B, and C, and the corresponding kinescopes to be identified as A', B' and C' respectively, and assuming that the main field of each pair of fields is identified as 1, and the interlace field as 2, the sequence of field scans produced by the three cameras may be as follows, A1, B2, C1, A2, B1, C2, for a cycle with repetition of such cycles. Each cycle thus includes both the main and the interlace fields for all three of the cameras, thus totaling six fields for the three cameras. Such six fields are produced during two complete encirclements of viewing produced by the cameras. During such cycle each camera is used twice for producing its two fields, and the two fields signalled for the three cameras (each), are interlaced in manner defined by the above defined sequence.

Each field production requires $\frac{1}{60}$ sec. Thus the cycle is produced in six times $\frac{1}{60}$ sec., being $\frac{6}{60}$ sec. or $\frac{1}{10}$ sec. Also, there being three cameras, such camera will be delivering its quota of video signals during $\frac{2}{60}$ sec. (for its two fields), namely, during $\frac{1}{30}$ sec. But the two fields produced by each camera will be separated from each other time-wise by the intervals needed for two other cameras to produce their fields, one field each; thus such two fields produced and signalled for each camera will be separated sequentially by two times $\frac{1}{60}$ sec., namely by $\frac{2}{60}$ sec. of non-viewing and non-signalling. Accordingly, the operations produced by the three cameras may be summarized as follows, for each camera, main field ($\frac{1}{60}$ sec.), followed by $\frac{2}{60}$ sec., non-viewing and non-signalling, followed by interlace field of such camera ($\frac{1}{60}$ sec.), followed by $\frac{2}{60}$ sec., non-viewing and non-signalling, producing return to starting point, and commencement of the next cycle. Accordingly, $\frac{6}{60}$ sec., are consumed by each camera's operations; but during such $\frac{6}{60}$ sec., or $\frac{1}{10}$ sec., lapse, both of the other cameras are functioning with their several viewings and signallings properly interwoven according to the sequence already described.

It is noted that each camera, under the operations described above, emits signalling for a field at the rate of one field every $\frac{3}{60}$ sec., being at the rate of twenty fields/sec. This rate is ⅔ the freqeuncy standard for highly continuous viewing of moving objects, and with only slight flicker to the eye, due to persistence of vision.

It is noted that the brightness of each field produced according to the foregoing operations, is not impaired, since the kinescope guns are continuing to operate according to conventional practice, established by the rules of the F.C.C. But the total interval of production of such brightness (namely, the total illumination) will be reduced as compared to continuous viewing and signalling by each camera. However, such reduction of total illumination may be largely compensated for, by adjustment of the conventional "Brightness" button of the receiver (receivers), to produce acceptable viewing operations.

An alternative operation which may be produced by the structures herein illustrated and described, is as follows:

Both the main and interlace fields for camera A will be produced, followed by both fields of camera B, followed by both fields of camera C. Since each field (either main or interlace) consumes $\frac{1}{60}$ sec., there are consumed $\frac{2}{60}$ sec., for the viewing and signalling of each camera, being a total of 6/60 sec., for all three cameras, being 1/60 sec. for the cycle. But in this operation there will be an interval of 4/60 sec., between the viewings and signallings of any one of the cameras, instead of 2/60 sec., under the previously described sequence of operations. Probably the first described operation will be found to be of less flicker, since the fields produced thereby are separated by only 2/60 sec. intervals. instead of 4/60 sec. intervals. The difference between the two operational sequences described above may be stated as follows: Under the first described sequence there are produced single fields every 3/60 sec., being at the rate of twenty fields/sec.; whereas under the second described sequence there are produced double field viewings and signallings at the rate of ten double field operations/sec., each camera viewing and signalling consuming 2/60 sec., and there being three cameras.

The following further comments are pertinent respecting the two described sequences above stated:

As will hereinafter appear, proper samplers are provided in connection with the viewing cameras, and in connection with the translating kinescopes, to ensure proper delivery of the video signal components to a transmission line in the former case, and to ensure proper delivery from such transmission line, of the video signals to the several kinescopes, in the latter case. Each of these samplers includes, schematically described, a set of contacts of proper angular embracement to transmit the needed signals for the time intervals proper to produce the sequence which is intended; so that as the advancing contact of the sampler successively engages each angular embracement contact, such engagement will continue for the needed length of time, it being noted that such samplers are shown schematically, and not in detail of structure. Also, each of such samplers is advanced from contact position to contact position progressively, and in proper synchronism with other related operations, all as will hereinafter appear. It is also noted that when using the sequence of viewings and signallings first described above, the sampler which serves the cameras must produce two complete operations of signal delivering for each camera, comprising the cycle of viewings and signallings already described; whereas when producing the sequence of viewings and signallings second described, the sampler need produce only one complete schematically illustrated revolution for each cycle of the viewings and signallings.

It is also noted that when using the sequence first described above, the operations of such sequence require that there shall be an odd number of cameras (and correspondingly, an odd number of kinescopes) since such sequence performance is one under which the viewings and signallings shall be performed successively for a main field of one camera, then the interlace field of the next camera, then back to the main field of the third camera, and finally, for the interlace field of the first camera, etc., repetitiously. If an even number of cameras and kinescopes should be provided when operating according to such sequence, each camera would produce only a single defined quality of field, always a main field or always an interlace field, as the case may be. Since the sequence described secondly is one under which each camera produces both its main field and its interlace field in direct succession, and without intermission for the production of fields from the other cameras between successively, such second described sequence may be practised under the conditions of either an odd number of cameras (and kinescopes) or an even number of each, as will be evident from study of the several relationships.

Other objects and uses of the invention will appear from a detailed description of the same, which consists in the features of construction and combinations of parts hereinafter described and claimed.

In the drawing:

The single figures shows, more or less schematically, an embodiment of our present invention, wherein the cross-scan records are produced by use of a deflectable beam unit, and wherein the sensing of such recordings is also produced by use of such a deflectable beam unit; together with a showing of three cameras each constituted to produce and deliver cross-scan signals, and corresponding to such cameras, three kinescopes of conventional form; and interconnections and elements of structure in combination with such cameras, such kinescopes, and such recording media, all as previously referred to herein.

In the drawing we have shown the three scanning cameras 292, 293 and 294, set to examine a common object, such as a blast-furnace tuyeres, of which the operations are under study, such tuyeres being shown at 295. These cameras are located in what is legended as "Camera Section." This will be referred to presently. We have also shown the three kinescope units 305, 306 and 307, located in the "Receiver Section," and the wide band, cross-scan recorder unit in the "Recorder." The camera section includes the three cameras which are interconnected, as respects their scan signal emitting functions; and the "Sampler" 296 is provided, as well as the "Sync. Generator," 299, the "Sampling Pulse Generator," 300, and the "Sync. Pulse Amp." The "Sampler" 296 is provided, together with various elements of circuitry legended to indicate their overall functions.

The scan signal output lines from the three cameras are respectively brought to the schematically indicated contacts A, B and C of the Sampler 296; and the rotary contact of that sampler successively engages such contacts which contacts are connected to the correspondingly legended cameras. Accordingly, such sampler receives and delivers scan signals from the three cameras in succession, the schematically shown contact making a complete sweep for reception and delivery of the scan signals from each of the three cameras, in succession, according to the operations already explained in outline. Such samples of signals, being in fact complete scans of the cameras or groups of such scans, as previously explained, are delivered over a common line through various adders, L.P. filter, and amplifier, to the output lines 297 and 298.

The recorder illustrated includes the wide band tape 100, driven at substantially uniform speed by the legended "Synchronous Motor" under control of the reversing switch legended "Playback or Record Reversing Motor Sw." The deflectable beam unit 111 is supported above the recording surface of the tape, according to the teachings of Letters Patent, No. 2,976,354, already referred to, and other patents and joint applications of said Banning and Ranseen or the executrix of Ranseen's estate. It is unnecessary to describe such deflectable beam unit here; but the following brief statement is pertinent to the present operational disclosures:

Such deflectable beam unit includes the conventional electron beam gun directing its laterally deflectable beam 117 against the curved target which, when excited by the beam, delivers a secondary beam which is readily transmitted through the curved window of the envelope, directing such secondary beam down towards the tape surface, which is of characteristics to receive and record the signals proportionate to the strength of the beam thus produced and directed by the gun. In the figure there are shown numerous curved cross-scans on the tape surface, rightwardly of the location of the deflectable beam unit, the tape travel being towards the right. The horizontal deflections of the beam are produced by the yoke element legended "Horiz. Control," such control being activated by potential over the lines 114. The gun strength is activated and controlled by the lines 113. These will be referred to hereinafter.

During play-back the gun strength is held steady by supply of proper steady potential over such lines 113. There is provided a detector plate beneath the tape opposite to the location of scan of the recorded signals.

During play-back the steady beam directed down against the cross-scan being sensed, is influenced by the strength of the recording of such scan, so that the effect produced on such detector plate varies, during the cross-scan, proportionately to the variations of the strength of the cross-scan recording. The detector plate delivers its variable potential thus produced, over the line $117^a$, as will appear hereinafter.

A synchronizing signal record producing unit $126^a$ is supported in position above the tape to produce synchronizing signal recordings 126 on the tape at spacings corresponding to groups of cross-scans, as signalled by pulses delivered to such unit $126^a$ over the lines $126^b$ and $126^c$, during the recording operations. A detector plate $126^d$ is provided beneath the tape opposite to the location of such unit $126^a$. During play-back the strength of the effect produced by the unit $126^a$ is held constant by delivery of constant potential over the lines $126^b$ and $126^c$, so that during play-back, each time one of the synchronizing signal recordings passes the unit $126^a$ a short pulse will be delivered over the line $117^a$. During the recording operation the "Sync. Generator" 299 and the "Sampling Pulse Generator" 300 deliver the synchronizing pulses corresponding to or defining the completion of the successive scans or groups of scans of the three cameras, over the lines 301 and 302. During the recording operation these lines are connected respectively to the lines $126^c$ and $126^b$ which connect to the synchronizing signal record producing unit $126^a$. During such recording operation the synchronizing signals from the units 300 and 299 are being delivered over the lines $299^a$ $299^b$ and $299^c$ to the lateral deflection circuits of the several cameras 292, 293 and 294, respectively. Accordingly, the synchronizing signals are recorded on the tape synchronously with the production of the lateral deflections in the several cameras. The scan signal variations from the three cameras are delivered over the lines $292^a$ and $292^b$, and $293^a$ and $293^b$, and $294^a$ and $294^b$, to the "Sampler" 296 by which the beam signals produced by the successive cameras, are successively delivered to the lines $296^a$. From such line $296^a$ such signals are delivered to the lines 297 and 298 which are connected to the gun of the deflectable beam unit 111, thus causing the recorded strength of each scan produced on the tape to vary proportionately to the variations of strength of the signals delivered by the cameras.

The receiver section includes the three kinescopes 305, 306 and 307 corresponding to the three cameras. There is also provided the unit legended "Deflecting Circuits," 309, and the unit legended "Sampling Pulse Generator" (without number), such units conveniently comprising portions of the "Receiver." The unit 309 delivers lateral deflection signals to the three kinescopes during play-back, over the lines $309^a$ and $309^b$. Such unit 309 also delivers lateral deflection signals over the lines $309^c$ and $309^d$ to the lines 114 which connect to the lateral deflection yoke on the deflectable beam unit 111, during play-back. Accordingly, during play-back the lateral deflections of the recorder unit 111, as well as the lateral deflections of the three kinescopes, are produced and controlled by a common unit, being the unit 319 of the receiver; whereas, during the recording operation, the lateral deflections of the recorder deflectable beam unit, 111, as well as the lateral deflections of the camera units, are produced by a common unit, being the unit 299 (or 300). By this arrangement, there is assurance that proper synchronization of the scans being recorded on the tape, with the lateral deflections being produced in the camera elements, is produced; whereas, during play-back, there is assurance that there will be synchronization of the lateral deflections produced by the kinescopes synchronously with the lateral deflections produced by the scanning unit 111. While it is necessary to ensure such synchronization between the lateral deflections of the recorder unit 111, and the cameras during recording, and to ensure such synchronization between the lateral deflections of the recorder unit 111, and the kinescopes during play-back, there is no definite requirement that the rates of lateral deflections of the beams of the deflectable beam units of the cameras, and of the kinescopes shall be the same during recording as during play-back when the recorder operation is included between the cameras and the kinescopes. This is true since during recording the kinescopes need not be in operation, and during play-back the cameras need not be in operation. In case it should be desired to cause the kinescopes to be in operation simultaneously with the recording operation, the rates of the lateral deflection signals to the kinescope beams and the rates of the lateral deflection signals to the cameras, should be the same. In the illustrated embodiment this result may be attained by causing both of the units 299–300 and 309, to produce their lateral deflection signals synchronously and at the same rate.

The switch unit 311 is provided to enable selective operation, either for recording the signals from the cameras, on the tape, or for play-back operation, to sense the recorded cross-scan video signals on the tape, and to cause the kinescopes to selectively produce rasters corresponding to the sensed signals. Such switch is shown in its recording position in the figure; by shifting the switch rightwardly, the recorded signals will be delivered selectively to the kinescopes corresponding to the cameras from which the recorded cross-scans, arrived. The following comments respecting these switching operations are pertinent:

With the switch in its leftward position as shown in the figure, the following connections are established:

The lines 297 and 298 from the camera section are connected to the lines 113 leading to the kinescope gun of the recorder deflectable beam unit 111; The lines 303 and 304 from the "Sync. Generator" unit 299 of the camera section are connected to the horizontal deflection yoke lines 114 of the recorder section; The lines 301 and 302 from the "Sync. Pulse Amp" unit of the camera section are connected to the lines $126^s$ and $126^b$ leading to the synchronizing signal recording unit $126^a$; The line $117^a$ from the video cross-scan detector plate is connected to a source of adjustable D.C. potential; and the line $126^d$ from the synchronizing signal detector plate is connected to a source of adjustable D.C. potential. Accordingly, with the switch in such leftward position, the scans from the three cameras will deliver their video signals for recording on the tape, cross-scan recordings of the variations of strength of such video scans of the cameras being produced, the sampler unit 296 receiving and delivering such camera scan signals from the three cameras in a repetitive sequence to the lines 297 and 298 leading to the gun of the deflectable beam unit. Such sampler unit may be constituted to cause such scan deliveries to occur for single scans from each of the cameras, or to occur for groups of such camera scans, so that either a single cross scan from each camera will be thus recorded, with spatial advance of the tape to receive only a single cross-scan record at a time or group, or such sampler unit may be constituted to cause a predetermined number of scans from each camera to be signalled for recording as a group, with each of the cameras in turn delivering a like group of scan signals for recording on the tape in succession, followed by the same number of scans from the next camera, with spatial repetition of such groups from all of the cameras. Since the presently specified rate of the scan operations is 15,750/sec. it is evident that a convenient operation might be one wherein each of the groups of scans from a camera would include 262 or 263 scans, providing for a rate of the groups of 60 groups/sec. Since there are shown three cameras in the figure, it follows that there would be recorded on the tape 60/3 groups of scans per second, providing a rate which could be afterwards translated by the kinescopes for production of the raster or picture at a rate acceptable without undue flicker. If desired, each group might be of 131 scans, in which case the groups would be produced at the rate of 40 groups of scans/sec.

It is noted that during such operation with the switch in its leftward position the lateral deflection producing yoke of the deflectable beam unit 111 is fed deflecting signals from the unit 299, and that the unit 309 of the kinescope or receiver section is not connected to such yoke. Also, that both of the detector plates for the sensing of the recorded cross-scans, and the recorded synchronizing signals, are not connected to the "Television Receiver" unit 310 of the receiver or kinescope section. Accordingly, under such switching arrangement, the receiver section will remain unactivated.

With the switch in its rightward postion, the following connections are established:

The lines 113 which lead to the deflectable beam unit gun are connected to positive and negative lines of a source of constant D.C. potential, so that the strength of the beam will remain constant. Also, the lines 114 which connect to the yoke of such deflectable beam unit, are connected to the lines 309$^c$ and 309$^d$ from the "Deflecting Circuits" unit 309 of the receiver section. Also, both of the detector plates for the recorded cross-scans sensings and for the recorded synchronizing signal recorded sensings are connected by their lines 117$^a$ and 126$^e$ to the line 310$^a$ leading to the unit 310 ("Television Receiver") of the receiver section. Also, that the synchronizing signal unit 126$^a$ has its lines 126$^b$ and 126$^c$ connected to a source of constant D.C. potential. Accordingly, with the switch in its rightward position, the following operational conditions are provided:

The strength of the beam of the deflectable beam unit 111 remains constant, so that the sensing effect produced during sensing of a recorded scan will be modified by the strength of the video signal recording at the position of such beam at any instant, and the detector plate beneath such recorded cross-scan will be subjected to variations of potential strength proportional to the varying strength of the recorded cross-scan. Accordingly, such varying video signal strengths will be delivered to the unit 310 of the receiver section. At the same time, the synchronizing signal detector plate will be subjected to effects of strength varying suddenly at arrival of each synchronizing signal recording, at the position of such synchronizing signal unit 126$^a$, it being noted that the lines 126$^b$ and 126$^c$ are, at the same time, connected to a source of constant D.C. potential. Thus the line 126$^e$ extending from such detector plate 126$^d$, will transmit the synchronizing signal pulses to the line 310$^a$ leading to the unit 310 of the receiver section. Also, the line 114 which lead to the yoke of the deflectable beam unit, will be connected to the lines 309$^c$ and 309$^d$ from the "Deflecting Circuits" unit 309 of the receiver. It is noted that the sampler unit 308 for the kinescopes of the receiver section, is also controlled by such unit 309, through the unit "Sampling Pulse Generator" (not numbered). Accordingly, the sampler is caused to function in proper synchronism with the deflections being produced in the three kinescopes.

We claim:

1. A television recording and playing-back system comprising in combination; a plurality of video cross-scan-signal producing cameras each including means constituted to repetitiously produce groups of successive cross-scan-signals of strengths corresponding to such viewings; a wide band tape having a signal recording surface, and means to advance said tape at substantially uniform speed; a scan-record producing unit in cross-scanning position proximate to the tape surface, including means constituted to receive cross-scan signals and to produce groups of cross-scan signal records on the tape of strength varying according to the variations of strength of the received signals; a first defined video signal sampler means constituted to cause the video-signal producing means of each camera to deliver groups of video signals in predetermined repetitive succession of such groups from said cameras to said signal record producing unit; together with first defined means to cause the cameras and the cross-scan record producing unit, to produce the groups of cross-scans of both said camera units and said cross-scan record producing unit at equal rates, with production of successive groups of cross-scan recordings on the tape in said repetitive succession and corresponding to the groups of cross-scan signals produced by the cameras; together with a synchronizing signal recording unit mounted in proximity to the recording surface of the tape, and constituted to produce synchronizing signal recordings on the tape; and connections between the first sampler unit means which is constituted to deliver to the cross-scan record producing unit, the successive groups of video signals, and to the synchronizing signal recording unit, constituted to cause the synchronizing signal record producing unit to produce a synchronizing signal recording on the tape corresponding to each group of the video signal recordings.

2. Structure as defined in claim 1; wherein the cross-scan record producing unit comprises a deflectable beam unit including lateral scan deflection producing means constituted to cause the beam of such unit to produce cross-scans corresponding to deflection producing signals received by said deflection producing means; and wherein the means which causes the cameras and the deflectable beam of the cross-scan record producing unit, to produce the cross-scans at equal rates, comprises a first defined lateral scan signal producing means, and connections from such first defined lateral scan signal producing means to the lateral scan producing means of the deflectable beam unit and to the cameras.

3. A structure as defined in claim 1; together with a plurality of kinescopes equal in number to the number of cameras; each kinescope including cross-scan producing means and a video signal input connection; second defined video signal sampler means constituted to receive video signals corresponding to sensing of recorded cross-scans on the tape, and to deliver groups of the sensed video signals to the video signal input connections of the kinescopes in a repetitious succession of such groups, to the kinescopes; means to cause the cross-scan producing means which is proximate to the tape surface, to produce its cross-scanning operations in manner to successively sense the video signal cross-scan recordings on the tape, and to deliver to the input element of the second defined sampler means, video signals corresponding to such sensings; means to successively sense the synchronizing signal recordings on the tape, and to deliver corresponding synchronizing signals to the second defined sampler means, effectively to cause such sampler means to deliver the sensed video scan record signals, to the kinescope video signal input connections in the repetitive succession of the successive groups of signals; and second defined scan-signal producing means to cause the kinescopes and the cross-scan producing means which is proximate to the tape surface, to produce their cross-scans at the same rate.

4. A structure as defined in claim 3; together with means to make ineffective the first defined means which causes the cameras and the cross-scan record producing unit, to produce the cross-scans of both said units at equal rates, and to make ineffective the first defined video signal sampler means; when the second defined scan-signal producing means which causes the kinescopes and the cross-scan producing means which is proximate to the tape surface and produces their cross-scans at the same rate, is effective, and the second defined video signal sampler means, is effective.

5. A structure as defined in claim 4; wherein the effective and ineffective making means, comprises switching means.

6. A structure as defined in claim 3; together with means to make ineffective the second-defined scan-signal producing means which causes the kinescopes and the cross-scan producing means which is proximate to the tape surface, and to make ineffective the second defined video signal sampler means; when the first defined means which causes the cameras and the cross-scan record producing unit, to produce the cross-scans of both said units at equal rates, is effective, and the first defined video signal sampler means, is effective.

7. A structure as defined in claim 6; wherein the effective and ineffective making means, comprises switching means.

8. A plural camera viewing and plural kinescope translating system, comprising in combination; a plurality of television cameras each constituted for viewing an object and constituted for delivery of video signals corresponding to the vantage point of such camera; and a plurality of kinescopes corresponding to such cameras; and video signal controlling means and video signal delivering means, and connections intermediate between the cameras and the kinescopes; wherein each camera is constituted for repetitious production and delivery of video signals for pairs of fields in succession, each pair comprising a main field and a corresponding interlace field, and wherein each kinescope is constituted to receive and translate the video signals for the fields received from the corresponding camera for production of a raster; wherein the video signal producing means and the video signal delivery connections include sampler means constituted to deliver to the kinescopes the video signals of the fields viewed by the cameras in a repetitious succession of fields; wherein the video signals of the main fields and the video signals of the interlace fields produced by each camera are delivered to the kinescope corresponding to such camera, in a repetitious sequence wherein the fields of the cameras are produced in the sequence of main field of camera "A," interlace field of camera "B," main field of camera "C," interlace field of camera "A," main field of camera "B," interlace field of camera "C," main field of camera "A," and repeat; and wherein the video signals of each main field produced by each camera are delivered to and translated as a main field of the kinescope corresponding to such camera, and the video signals of the interlace field produced by each camera are delivered to and translated as an interlace field of the kinescope corresponding to such camera.

9. A plural camera viewing and plural kinescope translating system as defined in claim 8; wherein there are included an odd number of cameras and a like odd number of kinescopes.

10. A plural camera viewing and plural kinescope translating system, comprising in combination; a plurality of television cameras each constituted for viewing an object and constituted for delivery of video signals corresponding to the vantage point of such camera; and a plurality of kinescopes corresponding to such cameras; and video signal controlling means and video signal delivering means; and connections intermediate between the cameras and the kinescopes; wherein each camera is constituted for repetitious production and delivery of video signals for pairs of fields in succession, each pair comprising a main field and a corresponding interlace field, and wherein each kinescope is constituted to receive and translate the video signals for the fields received from the corresponding camera for production of a raster; wherein the video signal producing means and the video signal delivery connections include sampler means constituted to deliver to the kinescopes the video signals of the fields viewed by the cameras in a repetitious succession of fields; wherein the video signals of the main fields and the video signals of the interlace fields produced by such camera are delivered to the kinescope corresponding to such camera, in a repetitious sequence wherein the fields of the cameras are produced in the sequence of main field and interlace field of camera "A"; main field and interlace field of camera "B," main field and interlace of camera "C," main field and interlace field of camera "*n*," and repeat; and wherein the video signals of each main field produced by each camera are delivered to and translated as a main field of the kinescope corresponding to such camera, and the video signals of the interlace field produced by each camera are delivered to and translated as an interlace field of the kinescope corresponding to such camera.

11. A plural camera viewing and plural kinescope translating system as defined in claim 10; wherein there are included an odd number of cameras and a like odd number of kinescopes.

12. A plural camera viewing and plural kinescope translating system as defined in claim 10; wherein there are included an even number of cameras, and a like even number of kinescopes.

References Cited

UNITED STATES PATENTS

| | | | |
|---|---|---|---|
| 2,696,523 | 12/1959 | Theile | 178—6.8 |
| 2,900,443 | 8/1959 | Camras. | |

ROBERT L. GRIFFIN, Primary Examiner

H. W. BRITTON, Assistant Examiner

U.S. Cl. X.R.

178—5.2, 6.8